Dec. 14, 1943.  R. H. CASLER ET AL  2,336,715
POWER GEAR SHIFTING MECHANISM
Original Filed Nov. 8, 1933  5 Sheets-Sheet 1

Inventors
Roger H. Casler
Stephen Voreck

By N. D. Parker Jr.
Attorney

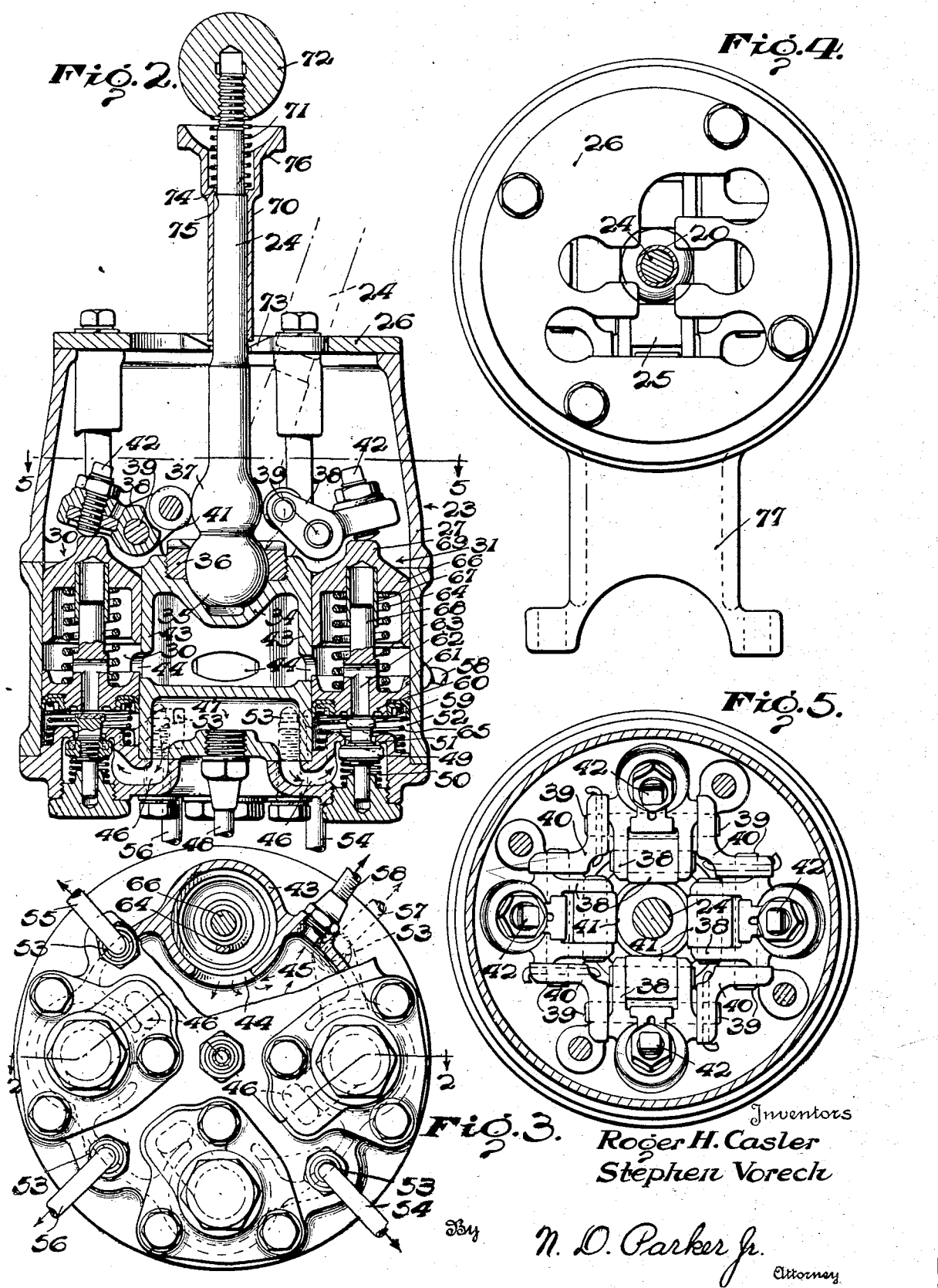

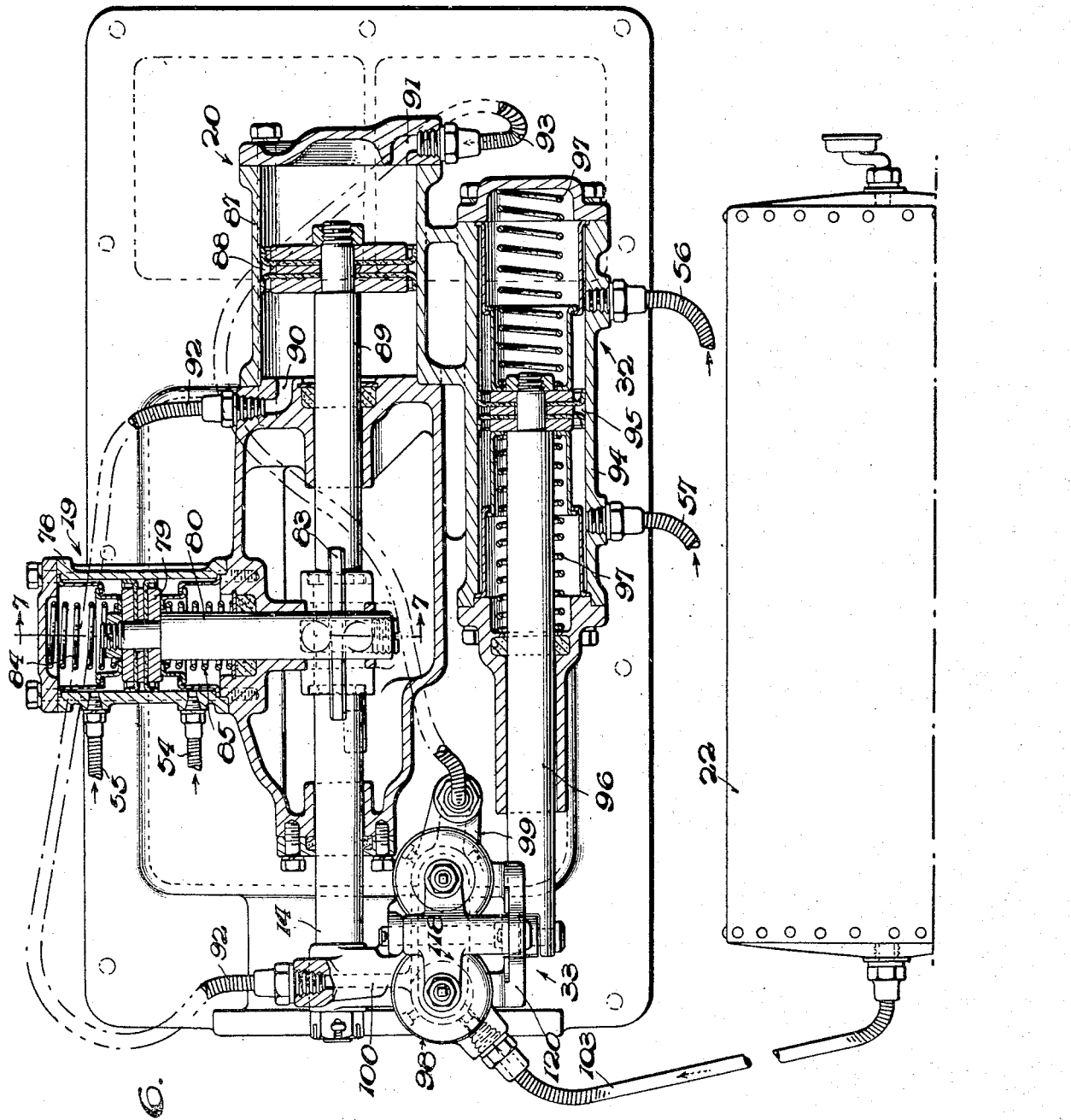

Dec. 14, 1943.   R. H. CASLER ET AL   2,336,715
POWER GEAR SHIFTING MECHANISM
Original Filed Nov. 8, 1933   5 Sheets-Sheet 4
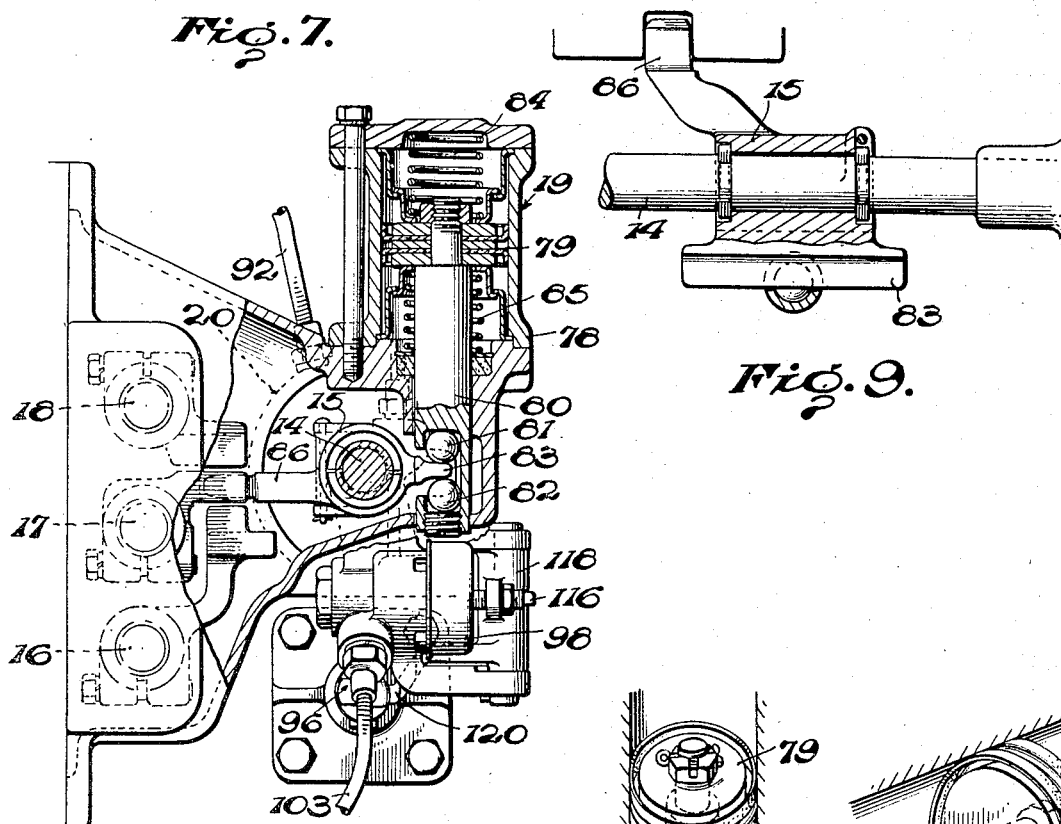
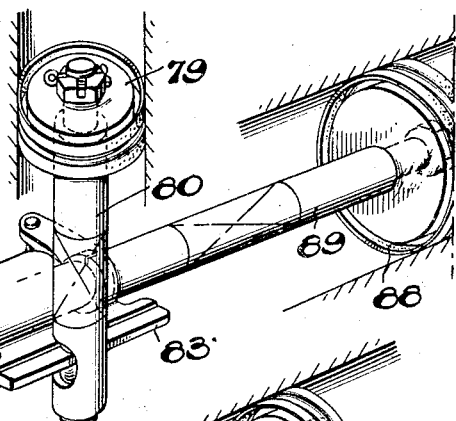
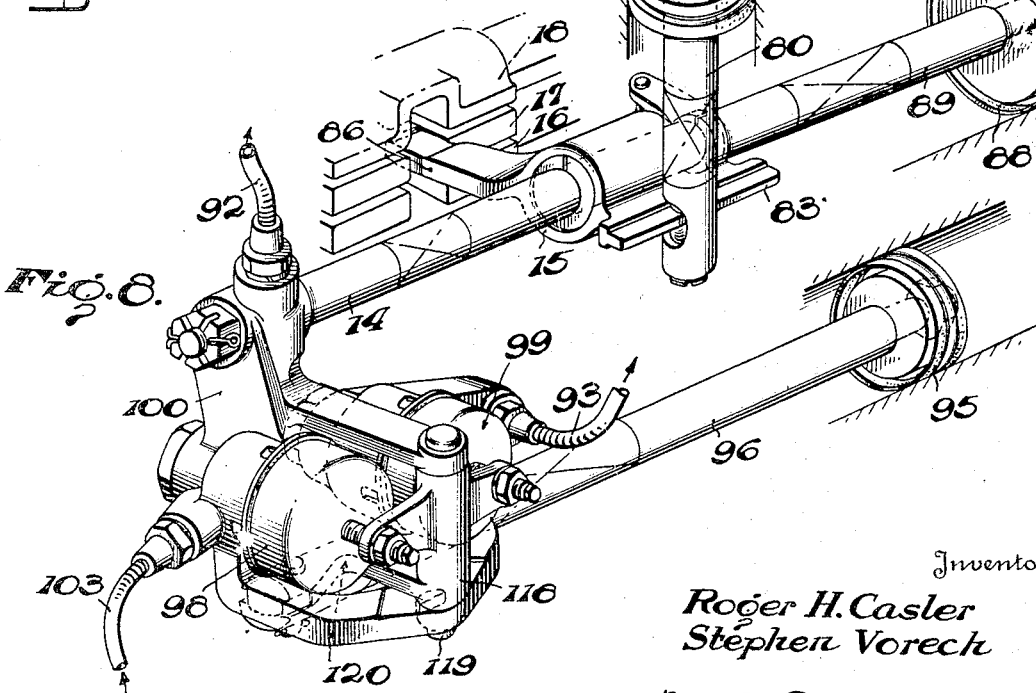
Inventors
Roger H. Casler
Stephen Vorech
By N. O. Parker Jr.
Attorney

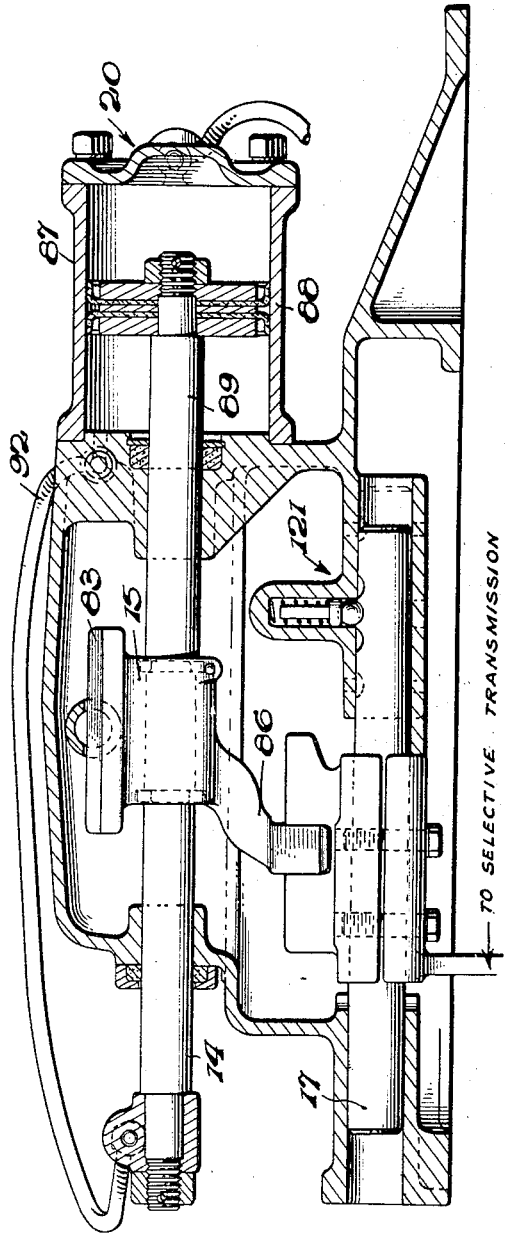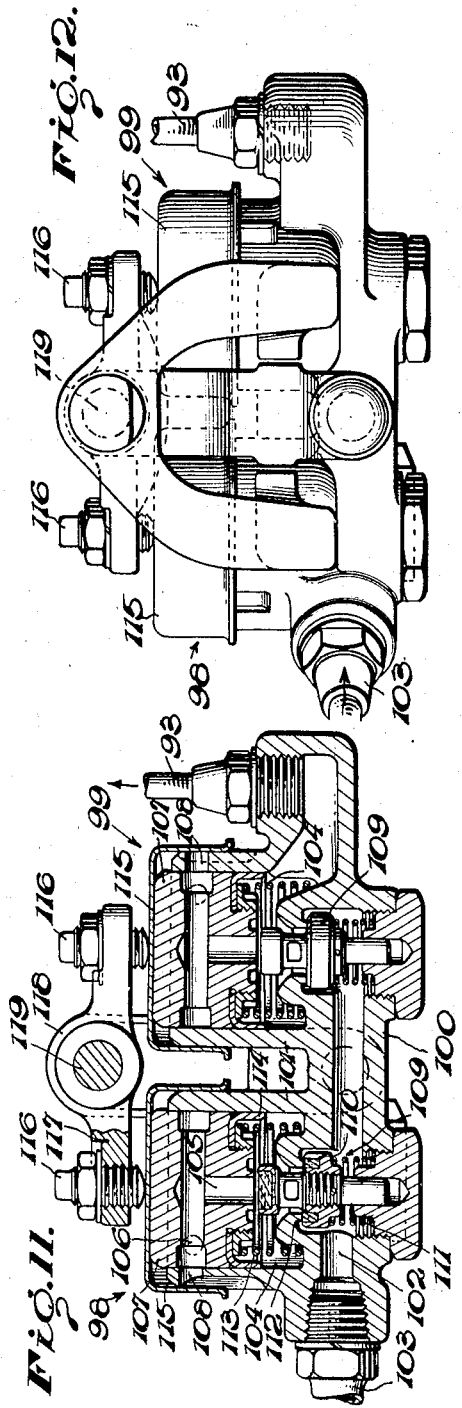
Inventors
Roger H. Casler
Stephen Vorech

Patented Dec. 14, 1943

2,336,715

UNITED STATES PATENT OFFICE 2,336,715

POWER GEAR SHIFTING MECHANISM

Roger H. Casler and Stephen Vorech, Elyria, Ohio, assignor to Bendix-Westinghouse Automotive Air Brake Company, Elyria, Ohio, a corporation of Delaware Original application November 8, 1933, Serial No. 697,193. Divided and this application March 4, 1943, Serial No. 478,038

14 Claims. (Cl. 137—144)

This invention relates to selective change-speed transmission mechanisms and more particularly to a control apparatus therefor.

It has heretofore been proposed to employ power means for effecting a change in the ratio of transmission gearing and with such an arrangement, control mechanisms for said power means have been utilized which have been conveniently located remotely from the transmission and readily accessible to the operator. The latter, when operating a motor vehicle equipped with such a structure, had merely to operate the conveniently-located control mechanism by a simple manual movement which thereby controlled the flow of fluid to said power devices to effect a change in the speed ratio of the transmission gearing. In the constructions heretofore utilized, however, the control devices operable by the operator have taken the form of rotatable valve mechanisms, switch contacts, push buttons and other devices, the operation or movement of which was totally dissimilar from the operation of the conventional gear shift lever which the power mechanism had replaced. Accordingly, an operator, accustomed to operating a vehicle provided with the conventional manually-operated gear shift lever, was compelled to change completely his accustomed methods of gear changing when it became necessary for him to operate a vehiile equipped with the above referred to remotely-controlled power gear shifting device. This has been found to be a rather serious disadvantage, resulting in confusion and improper operation of the prior power-operated change-speed transmissions.

It is, therefore, one of the objects of the present invention to provide a transmission gearing control mechanism so constituted as to avoid the above referred to difficulties.

Another object of the invention is to provide a power-operated selective gear-shifting mechanism so constructed and arranged that the movements of the same in effecting a control of the changing of the transmission gearing simulate in every respect the corresponding movements of a conventional manually-operable gear shift lever to the end that an operator may readily operate a vehicle equipped with such mechanism in the same manner as if the vehicle were provided with a manually-operable gear shift.

Another object is to provide in a transmission gearing controlling mechanism having gears shiftable by power, a manually-operable pivotally-mounted controlling device located adjacent the operator and movable in a manner simulating the movement of a conventional gear shift lever for controlling the shiftable gears.

Still another object contemplates the provision, in a device of the above character, of a remotely-positioned dummy gear shift lever operable in a gear-shifting simulating manner to effect the control of power to the power-operated gear-shifting mechanism, whereby an operator may readily and efficiently control the necessary changes in the gearing ratios of the transmission by manually moving a control member in the same manner as that to which he had been accustomed when manually shifting the transmission gearing.

A further object is to provide in a manually-controlled power-operated gear-shifting mechanism, a novel control apparatus therefor including an arrangement insuring that the extent of movement of the gear-shifting member will be substantially proportional to the extent of movement of the control member whereby an exceedingly accurate control may be exercised by the operator over the shifting of the gears.

A still further object is to provide a fluid pressure-operated power gear-shifting mechanism having a manually-operable control member and means controlled thereby in such a manner that the movements of such control member to effect a shifting of the transmission gears will be resisted by a force substantially proportional to the extent of movement of the gear-shifting member whereby a "feel" or reaction to shifting will be experienced by the operator in a manner simulating the reaction encountered in manually shifting transmission gears in the conventional manner.

A further object is to provide a novel arrangement of control apparatus for a mechanism of the above character which shall be readily accessible for operation, shiftable in the conventional manner, capable of ready installation upon motor vehicle transmissions and of rugged construction and economic cost.

Other objects and novel features of the invention will appear more fully hereinafter from the following description taken in connection with the accompanying drawings. It is to be expressly understood, however, that the drawings are employed for purposes of illustration only and are not designed as a definition of the limits of the invention, reference being had for such purpose to the appended claims.

Referring to the drawings, wherein similar reference characters refer to similar parts throughout the several views:

Fig. 2 is a sectional view of the manually-operable control device;

Fig. 3 is a bottom plan view, partly in section, of the control device of Fig. 2;

Fig. 4 is a top plan view of the device of Fig. 2;

Fig. 5 is a top view of the parts of Fig. 2 taken along line 5—5 of said figure;

Fig. 6 is a sectional plan view of the power control mechanism of the present invention illustrating the same associated with a selective change-speed transmission;

Fig. 7 is an end view, partly in section, of a transmission and one of the power devices shown in Fig. 6 and taken along line 7—7 of said figure;

Fig. 8 is a perspective view of the main shifter bar of the transmission and the power-operated devices associated therewith;

Fig. 9 is a detailed sectional view of the main shifter bar and shifting member carried thereby;

Fig. 10 is a side view, partly in section, of the power-operated main shifter bar and illustrates the manner of connecting the shifting member to an auxiliary shifter bar of the transmission;

Fig. 11 is a sectional view of a control valve mechanism employed with the present invention, and Fig. 12 is a side view of the valve mechanism of Fig. 11.

Figure 1:
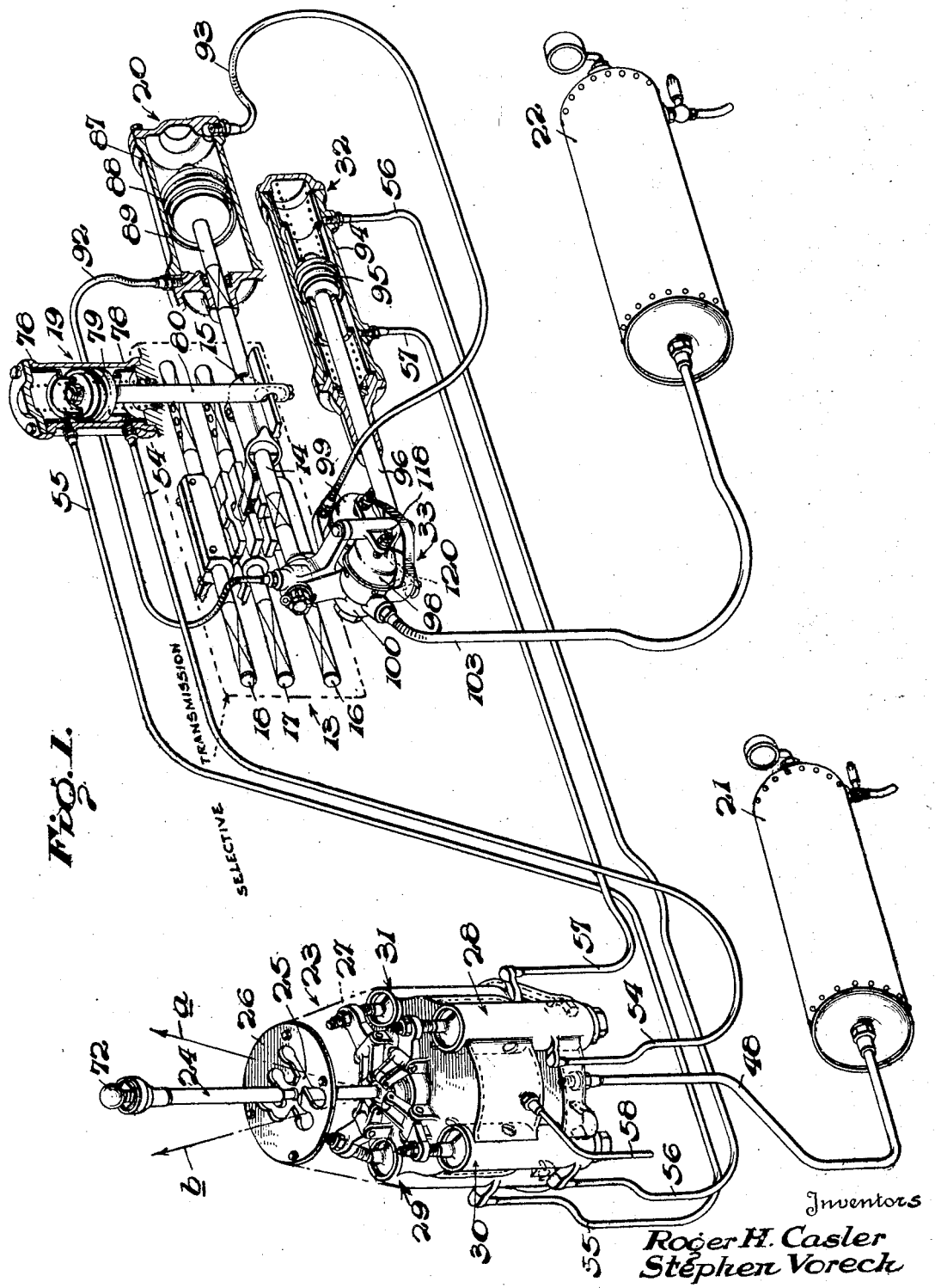
Fig. 1 is a diagrammatic view, having certain parts in section, of a gear-shifting control mechanism constructed in accordance with the principles of the present invention.

Referring more particularly to Fig. 1, a transmission control device embodying the principles of the present invention is illustrated therein in connection with a selective change-speed transmission gearing mechanism 13 of any suitable type employing shiftable members for changing the gear ratio between a driving and a driven shaft. As shown, such mechanism may be provided with a main shifter bar 14 carrying shifting member 15, which latter is adapted to select and move in a longitudinal direction, one of a plurality of auxiliary shifter bars 16, 17 or 18 to effect a desired gear relation. A power device 19 is provided for moving the shifting member 15 laterally in opposite directions to select a desired shifter bar and a second power device 20 is employed for moving the said member and selected shifter bar longitudinally, and these power devices are preferably operated by a fluid pressure differential. As shown, the said devices are operated by air under pressure from reservoirs 21 and 22 in a manner which will appear more fully hereinafter, it being expressly understood, however, that the fluid means herein disclosed has been shown by way of example only and that any suitable fluid may be utilized.

Control means are provided by the present invention for manually controlling the flow of fluid under pressure to the power devices 19 and 20 for effecting a remote control of the operation of said devices and preferably such control means are so constituted as to be readily accessible to the operator and operable in a manner simulating the movements of a conventional manually-operable gear shift lever, whereby the movements of said control mechanism will be similar to the movements imparted to the manually-shiftable lever of a conventional selective change-speed transmission. As shown, such manually-operable control mechanism indicated generally at 23 comprises a pivotally-mounted manually-operable dummy gear shift lever 24 capable of lateral and longitudinal movements in opposite directions in the same manner as the corresponding movements of a conventional gear shift lever. Preferably, such lateral and longitudinal movements of the lever 24 are guided by suitably shaped slots 25 formed in a cover plate 26 secured to a casing 27 housing the said mechanism, the shape and positioning of the said slots conforming to the configuration necessary to properly guide the lever 24. A pair of similar valve mechanisms 28 and 29 are provided for controlling the movement of the power device 19, the operation of these valve mechanisms being effected by lateral movement of the control lever 24, while another pair of valve mechanisms 30 and 31, similar in construction to valves 28 and 29, are provided for controlling the operation of the power device 20, such latter valve mechanisms being operated upon longitudinal movement of the control lever 24. Thus it will be seen, as heretofore stated, that lateral movements of the control lever 24 will effect a selection of the desired auxiliary shifter bar and that longitudinal movements of the said control lever will effect longitudinal movement of the selected shifter bar to accomplish the desired gear relation, these operations taking place in a manner simulating the corresponding movements of a conventional manually-operated gear shift lever.

In order that the degree of pressure supplied to the pressure device 20 and hence the operation of the main shifter bar 14 moved thereby may be accurately controlled, a fluid pressure-operated relay or pilot device is provided, the operation of which depends upon the functioning of valves 30 and 31. The energization of this relay effects a control of the fluid pressure admitted to the device 20 through the medium of a valve mechanism 33, the latter preferably being of the follow-up type and having cooperating portions connected with the movable element of the relay and the main shifter bar 14 respectively, the construction being such that when the valve is operated to admit fluid under pressure to the device 20, operation of the latter will effect a lapping of the valve mechanism and hence an interruption of the power fluid. In this manner, the movement of the main shifter bar 14 may be readily controlled in a manner proportional to the extent of longitudinal movement of the control lever 24.

With the above brief general description of the main constituent parts of the arrangement constituting the present invention, reference will now be had to the remaining figures of the drawings illustrating the various parts of the system more in detail. Referring more particularly to Figs. 2 to 5, the housing 27 of the control mechanism 23 is centrally formed with a seat 34 for receiving the spherical end 35 of the control lever 24, a suitable retaining nut 36 being provided for maintaining the end 35 in position, the arrangement being such that the control lever is mounted for universal movement. The control lever is also provided adjacent its lower extremity with a curved cam surface 37 adapted, when the control lever is moved out of its central position, to operate one or another of the valve mechanisms 28, 29, 30 or 31 through the intermediary of a rocker arm 38 suitably pivotally mounted upon a pin 39 carried in lugs 40 formed integrally with the control mechanism casing. Each of the rocker arms 38 is provided at one extremity with a cam roller 41 directly engaging the cam surface 37, and at the other extremity with an adjustable screw 42 for direct engagement with the valve-operating element.

Each of the control valves 28 to 31 is similar in construction and is preferably of the pressure-lapped type and so constituted as to exert a resistance to opening movement proportional to the applied force. As shown, each of the valve mechanisms comprises a circular well 43 formed in the mechanism casing, each of said wells being provided with an exhaust port 44 communicating with a centrally-disposed exhaust chamber 45.

Each well is also provided with an intake port 46 communicating with a centrally-disposed inlet chamber 47, the latter communicating through a suitable conduit 48 with the reservoir 21. The lower portion of each valve-receiving well is provided with an intake valve 49 normally resiliently urged as by means of a spring 50 against a seat 51, thus normally closing off communication between the intake chamber 47 and an outlet chamber 52 which communicates through a duct 53 and suitable conduits with one of the control devices associated with the transmission. With reference to Fig. 1, the outlet ports 53 are connected to conduits 54, 55, 56 and 57 for the valves 28 to 31 respectively. The exhaust chamber 45 communicates with the atmosphere through a suitable conduit 58.

Directly connected to the intake valve 49 is an exhaust valve 59 normally spaced from a seat 60 formed on a centrally-bored piston member 61. The latter is provided with communicating ducts 62 and 63 which normally provide communication between the exhaust chamber 45 and the chamber 52 through the normally open valve 59. In the normal position of the parts, opposed springs 64 and 65 act upon the piston 61 in such a manner that the above referred to communication between chambers 52 and 45 is established. The spring 64 is normally confined between the piston 61 and a cup 66, the latter constituting the valve-actuating element and being provided with a socket 67 for receiving the upwardly-extending central portion 68 of the piston 61, and a button 69 on the top thereof for engagement with the screw 42.

From the above description, it will be apparent that all four of the valves 28 to 31 inclusive are so positioned that the outlet chambers 52 will all communicate with the atmosphere. Upon movement of the control lever 24 to the right, as shown in dotted lines on Fig. 2, lever 38 will be moved clockwise about its pivotal mounting 39 to effect a movement of cup 66 downwardly which through spring 64 will serve to move piston 61 until communication between chambers 52 and 45 is interrupted by engagement of the seat 60 with the exhaust valve 59. Further downward movement of the piston 61 will thereafter result in a slight opening of the intake valve 49, against the resistance of spring 50, whereupon fluid under pressure from the intake chamber 47 will be led through duct 46 into the chamber 52 and through duct 53 to the conduit 57 shown in Fig. 1. It will be apparent that as the pressure of the fluid in chamber 52 builds up due to the opening of the intake valve, there will be a tendency for piston 61 to move upwardly in opposition to the applying force. As soon as the force under the said piston, due to such pressure and the expansive effect of spring 65, becomes sufficiently great to slightly overcome the applying force, the said piston will move upwardly slightly and spring 50 will effect a lapping of the intake valve 49. Such upward movement of the piston, after the valve mechanism has been placed in operation, enables a feel or reaction to be experienced by the operator when manually operating the control lever 24, to the end that he will be more readily able to accurately control the flow of fluid under pressure to the pressure-operated devices associated with the transmission. After a closure or lapping of the intake valve, it will be readily understood from the above that the pressure within chamber 52 will be proportional to the extent of movement of rocker-arm 38 and hence the extent of movement of control lever 24. Thus the degree of pressure within conduits 54—58 and hence within the controlling devices 19 and 32 may be readily controlled by the extent of movement of the control lever. It will also be apparent from the above that lateral movement of control lever 24 in either direction will effect operation of the oppositely-disposed valves 28 and 29 while longitudinal movement in either direction in any of the longitudinally-disposed slots in the cover plate 26 will effect operation of the valve mechanisms 30 or 31.

In order to lock the control lever 24 in neutral position or in the extremities of the longitudinally-disposed slots 25, the control lever 24 is provided with a control sleeve 70 normally resiliently urged downwardly as by means of a spring 71 confined between the said sleeve and a ball or grip 72 positioned at the upper end of the lever. The edges of the plate 26 defining the slots 25 are preferably slightly beveled as indicated at 73 and the lower end of the sleeve 70 is almost in engagement with said edges, the movement of sleeve 70 toward the latter being limited, however, by engaging shoulders 74 and 75 on the sleeve and control lever respectively. With this construction, it will be apparent that before movement of the lever 24 in any direction may be effected, the operator must first move the sleeve 70 upwardly against the tension of spring 71, as by means of grasping a cap 76 formed on said sleeve at the time the grip 72 is grasped. Preferably the casing 27 is provided with a bracket 77 in order to enable the control mechanism to be attached to the motor vehicle steering column below the steering wheel, this method of assembly enabling the control device to be readily accessible to the operator.

The power device 19, heretofore described as effecting lateral movement of the shifting member 15, is preferably of the double-acting type and includes a cylinder 78 housing a piston 79, Figs. 6 and 7. The latter has connected thereto a suitable piston rod 80, the lower extremity of which is formed with a recess for receiving ball bearings 81 and 82 between which an arm 83 of the shifting member 15 projects, the construction being such that longitudinal movement of the piston rod will effect movement of the member 15 in one direction, while permitting the latter to be moved transversely of the piston rod 80 in substantially frictionless manner. Preferably a pair of precompressed springs 84 and 85 are disposed upon either side of the piston 79 in order to bring the latter to mid position upon exhaustion of fluid pressure from either side of the cylinder, this movement bringing the shifting member 15 also to central or neutral position wherein the end portion 86 thereof, Fig. 7, is positioned mid-way between the outermost auxiliary shifter bars 16 and 18 and in engagement with the central auxiliary shifter bar 17. As shown, the springs 84 and 85 are initially precompressed when assembling the parts constituting device 19, the same being confined between the cylinder heads and cups 84a and 85a respectively. The latter are provided with outwardly-turned circumferential flanges 84b and 85b respectively engaging corresponding flanges 84c and 85c upon cups 84d and 85d, these last mentioned elements being secured at their opposite ends to the cylinder 78 in any suitable manner. From this construction, it will be readily observed that when fluid pressure is exhausted from both sides of device 19, the springs 84 and 85 will quickly center the piston 79, the engagement of flanges 84b with 84c or 85b with 85c constituting a positive limit stop for insuring that under these conditions the piston 79 will be precisely centered and the shifter finger 86 controlled thereby properly neutralized.

From the above description of the power device 19, it will be understood that the parts normally occupy the positions shown on Figs. 1, 6 and 7 wherein the shifting member 15 is neutralized and the end portion 86 thereof is in engagement with the intermediate auxiliary shifter bar 17. Upon admission of fluid under pressure to the lower side of cylinder 78, for example, by operation of valve mechanism 28, the shifting member 15 will be moved laterally to effect selection of the auxiliary shifter bar 16 while fluid under pressure admitted to the upper part of cylinder 78 would have caused the shifting member 15 to have selected the auxiliary bar 18. Upon exhaust of fluid under pressure from either side, however, the resilient means 84 and 85 will immediately return the shifting member 15 to neutral position. In the transmission mechanism disclosed, it has been assumed for purposes of illustration that the shifter bar 16 in its reciprocating movements to the left and right, Fig. 1, will effect engagement of first and second gear respectively, while corresponding reciprocating movements of the auxiliary shifter bar 17 will effect engagement of third and fourth speeds. Reciprocation of the auxiliary shifter bar 18 to the right, Fig. 1, will effect engagement of the reverse gear, these elements corresponding to the gear changes of a well-known commercial selective transmission. These elements, however, are for purposes of illustration only, it being understood that the invention is equally well applicable to selective transmissions involving other speed-changing combinations.

After selection of the desired auxiliary shifter bar by operating the power device 19, as set forth above, fluid under pressure is admitted to the power device 20 to control longitudinal movement of the shifting member 15 and the selected shifter bar to effect the desired gear relation. Referring to Figs. 1, 6, 8, 9 and 10, the power device 20 preferably comprises a double-acting cylinder 87 having a piston 88 therein provided with a piston rod 89, which latter is extended to form the main shifter bar 14 and on which the shifting member 15 is mounted in such a manner as to be rotatable of said rod but longitudinally movable therewith. Upon either side of the piston 88, cylinder 87 is provided with openings 90 and 91 communicating with the valve mechanism 33 through suitable conduits 92 and 93 respectively.

Preferably, as heretofore stated, the flow of fluid pressure to the power device 20 is controlled by a fluid-pressure-operated pilot or relay device 32 and, as shown, Figs. 1, 6 and 8, such relay is constituted by a double-acting cylinder 94 having a reciprocating piston 95 therein to which is secured a piston rod 96. The piston 95 is preferably resiliently biased to central position by means of precompressed springs 97 in order that the said piston may be immediately returned to central or neutral position upon exhaustion of fluid under pressure from either side thereof. The control of fluid under pressure to the relay or pilot device is effected, as above set forth, by means of valves 30 and 31, which latter are controlled by the longitudinal movements of the control lever 24, the construction being such that operation of the valve 30 will admit fluid under pressure through conduit 56 to the right end of the relay, while operation of the valve 31 will admit fluid under pressure through conduit 57 to the left end portion of the relay, see Fig. 6. Admission of fluid pressure to either end of the relay will effect longitudinal movement of piston rod 96 and consequent operation of the valve mechanism 33 associated therewith to control the flow of fluid under pressure to the power device 20 in a manner which will appear more fully hereinafter.

As heretofore stated, the follow-up valve mechanism 33 is formed of cooperating elements carried by the main shifter bar 14 and the piston rod 96 of the relay 32 respectively in order that the movements of the former may be readily controlled by relative movement between these two elements to effect an accurate control of the degree of pressure and hence the extent of movement of the pressure device 20. To this end, the valve mechanism 33 comprises a pair of similarly-constructed valves 98 and 99, Fig. 11, which are structurally quite similar to the valves 29 to 31, each of the first mentioned valves being housed within a casing 100 rigidly secured to the free end of the main shifter bar 14, Figs. 6 and 8. The casing 100, see Fig. 11, is provided with a pair of wells 101 for receiving the valves 98 and 99, the casing being provided with an inlet opening 102 communicating through a suitable conduit 103 with the auxiliary reservoir 22 for conducting fluid under pressure from said reservoir to the outlet chambers 104, the latter being normally open to the atmosphere through ducts 105 and 106 provided in piston 107. The last named duct normally communicates with the atmosphere through ports 108 positioned in the side wall of the wells 101. A combined intake and exhaust valve structure 109 having an intake valve element 110 is normally resiliently urged as by means of a spring 111, to such a position that the intake valve contacts a seat 112 formed in the casing 100 to close off communication between the chamber 104 and duct 105. The pistons 107 are normally biased to the position shown by means of springs 113 which maintain the said pistons spaced from an exhaust valve element 114. Each of the pistons 107 is provided with a suitable dust cover 115 in constant engagement with actuating screws 116 carried by arms 117 of a valve applying rocker lever 118, the latter being suitably journaled upon a pivot pin 119 carried by the casing 100 and having an arm 120 formed integrally therewith and connected in any suitable manner to the free end of the relay piston rod 96, Figs. 7 and 8. From this construction, it will be readily observed that movement of the relay piston rod 96 in either direction will, through arm 120, rock member 118 to operate one or the other of valves 98 or 99 for effecting closure of the exhaust valve 114 and opening of the intake valve 110, thereby permitting fluid under pressure to be conducted from the auxiliary reservoir 22 through conduit 103 to the proper chamber 104. In the case of valve 98, the chamber 104 is connected through the conduit 92 to the left-hand end of the power device 20, Fig. 6, while in the case of valve 99, the chamber 104 communicates with the right-hand end of the said power device through conduit 93. In either event, that is upon actuation of either of the said valve elements, as soon as fluid under pressure has been conducted to the power device 20, the piston 88 and main shifter bar 14 move in the desired direction and move the valve casing 100 in a manner to effect a lapping of the operated valve. As soon as the said valve has become lapped, further movement of the piston 88 will be arrested until additional fluid under pressure has been admitted to the relay 32 to again effect operation of the desired valve mechanism, it being pointed out that longitudinal movement of each auxiliary shifter bar is resisted by means of suitable spring detent devices 121, Fig. 10. Thus the piston 88 follows every movement of the relay piston 95, the latter thereby exercising an accurate control over the former.

From the above description, it will be apparent that in order to shift into first gear, it is only necessary to move the dummy gear shift lever 24 laterally to the position a and then longitudinally forwardly, Fig. 1. The lateral movement will operate valve mechanism 28 permitting fluid under pressure to flow from reservoir 21 through conduits 48 and 54 to the lower portion of power device 19 whereupon the latter, through the upward movement of piston rod 80, will move the shifting member 15 in such a direction as to associate the operating end 86 thereof, Figs. 7 and 8, with the auxiliary shifter bar 16. The subsequent longitudinal movement of the control lever, after selection of the shifter bar 16, will effect operation of the valve mechanism 30, thus permitting fluid under pressure to be conducted from the reservoir 21 through conduits 48 and 56 to the right-hand end of the relay 32, Fig. 1. As the piston 95 of the latter moves to the left, as viewed in this figure, the rocker member 118 will be operated through arm 120 to open valve mechanism 99 thus establishing communication between the auxiliary reservoir 22 and the right-hand end of power device 20 through conduits 103 and 93. Movement of the piston 88 will then shift the main shifter bar 14 and shifting member 15 carried thereby, to the left thereby moving the selected shifter bar 16 in a corresponding direction to establish first gear relation, it being appreciated that due to the follow-up feature of valve 99, the extent of movement of the selected shifter bar, against the resistance of the resilient device 121, Fig. 10, will be controlled by the degree of pressure within device 32, which degree of pressure is in turn controlled by the extent of movement of the control lever.

In shifting into second gear, the control lever is moved longitudinally in the opposite direction from that occupied above, which movement will cause the shifter bar 16 to be correspondingly shifted. When the control lever is initially moved rearwardly, the valve 30 will be moved to exhaust position by means of springs 64 and 65 whereupon the relay 32 will be exhausted and the springs 97 associated therewith will quickly bring the piston 95 of said device to central position. It will be appreciated that as the latter movement occurs, the valve rocking lever 118 will be moved in a direction opposite to that occupied above, to exhaust the right-hand end of device 20 through valve mechanism 99 and to operate valve mechanism 98 to communicate the left end of device 20 with the auxiliary reservoir. The piston 88, main shifter bar 14 and the auxiliary shifter bar 16 will thereupon be moved to the right, Fig. 1. If the control lever is arrested in its longitudinal movement intermediate its extreme positions, that is, before actuation of valve 31, the shifter bars 14 and 16 will be returned to and will remain in central position due to the lapping and exhausting of valve 98. As soon as valve 31 has been operated, however, by continued rearward longitudinal movement of the control lever, fluid under pressure will be conducted through conduits 48 and 57 to the left end of the relay 32 whereupon the reverse of the above described movements of the relay and power device 20 will be effected, and second gear relation will be established.

When shifting to third gear, the control lever 24 will be moved back to the normal neutral position indicated in Fig. 1 where the shifting member 15 automatically selects the central auxiliary shifter bar 17. During this movement of the control lever, the valves 31 and 28 will be exhausted in the order named, the first enabling the centralization of pistons 95 and 88 and the second enabling the centralization of piston 79 by means of springs 84 and 85. Thereafter, forward movement of the lever 24 will effect operation of valve 30 to admit fluid under pressure to the right end of relay 32 which in turn will operate valve 99 to admit fluid power to the corresponding end of device 20. The shifter bars 14 and 17 will thereupon be moved to the left, Fig. 1, and third gear relation established.

In order to shift into fourth gear, it is only necessary to effect a shift of the bars 14 and 17 in the opposite direction which is effected by moving the control lever 24 rearwardly to exhaust valve 30 and operate valve 31. The relay 32 and device 20 will thereupon be moved to the right in a manner similar to that above described when shifting from first to second gear.

Should it be desired to shift from neutral position to reverse, the control lever is initially moved laterally to the right, as shown at b, Fig. 1, to operate valve 29 to admit fluid under pressure to the top of device 19 through conduits 48 and 55. Downward movement of the piston 79 and rod 80 will move shifting member 15 such that the portion 86 thereof selects the auxiliary shifter bar 18, Figs. 1 and 8. Thereafter, rearward longitudinal movement of the control lever 24 will operate valve 31 thereby admitting fluid power to the left end of relay 32, moving the piston 95 therein to the right, and causing a corresponding movement of piston 88 of power device 20 together with shifter bars 14 and 18, in a manner similar to that described above.

There is thus provided by the present invention a novel remote control for a selective change-speed transmission, so constituted that the gear ratios are efficiently varied by fluid power through the agency of a manually-operable control element or dummy gear shift lever operable in a manner simulating the movements of a conventional manually-operable gear shift lever. Such an arrangement permits an operator, accustomed to the manual operations necessary for gear shifting, to readily and efficiently operate a transmission equipped with the present invention. The provision of the pressure-lapped valves directly controlled by the movements of the control lever enables a feel or resistance to be encountered by the operator, while the provision of the fluid pressure relay and valve mechanism controlled thereby permits an exceedingly accurate control over the movements of the longitudinal shifting power device, to the end that the various gear relations may be established without clashing. The fluid pressure relay and the laterally-shifting power device are both provided with opposed precompressed resilient devices, such a construction enabling a rapid centralization of the actuated parts thereof and hence quick movement of the shifting member to neutral position. This arrangement insures the required neutralization of the gears of the transmission when shifting from one gear to another, and especially is this feature desirable when "double-clutching," a phase of the gear-changing operations so generally practiced when shifting from one gear ratio to another.

While only one embodiment of the invention has been illustrated herein, it is to be expressely understood that the same is not limited thereto but is capable of being embodied in various forms, as well understood by those skilled in the art, without departing from the spirit of the invention. Reference will, therefore, be had to the appended claims for a definition of the limits thereof.

This application is a division of our application filed November 8, 1933, Serial No. 697,193, entitled Power gear shifting mechanism.

What is claimed is:

1. The combination in a fluid pressure control valve having a casing and a pair of control valve mechanisms mounted in said casing each provided with inlet and exhaust valves and a pressure responsive element for actuating said valves, of means for selectively actuating one or both of said valve mechanisms including a lever mounted on said casing for universal movement with respect thereto, and a resilient connection between said lever and each of said elements, whereby the degree of pressure delivered by each valve mechanism is proportional to the degree of movement of said lever.

2. The combination in a fluid pressure control valve having a casing and a pair of control valve mechanisms mounted in said casing each provided with inlet and exhaust valves and a pressure responsive element movable for actuating said valves, of means for controlling the operation of said valve mechanisms separately or concurrently including a lever mounted on the casing for universal movement with respect thereto and operable in one plane for actuating one of the valve mechanisms and in another plane for actuating the other valve mechanism, and means cooperating with the lever and pressure responsive elements including a resilient connection between the lever and each of said elements for so controlling the pressure delivered by each of said valve mechanisms that the delivered pressure is substantially proportional to the degree of movement of said lever in one or the other of said planes.

3. The combination in a fluid pressure control valve having a casing and a pair of control valve mechanisms mounted in said casing each provided with inlet and exhaust valves, movable pressure responsive elements for actuating said exhaust valves and movable members resiliently connected therewith for controlling the operation of said valves by said pressure responsive elements for controlling the degree of pressure delivered by the valve mechanisms in accordance with the degree of movement of said members, of means for controlling the operation of said members including a control lever pivotally mounted on said housing for universal movement with respect thereto operable in one plane to actuate one of said members and control the corresponding valve mechanism to effect the delivery of a pressure substantially proportional to the degree of displacement of said lever and operable in a second plane to control the actuating member of the other valve mechanism to control the delivery by the latter of a pressure substantially proportional to the degree of displacement of said lever in said second named plane, and means for connecting said lever and members.

4. The combination in a fluid pressure control valve having a casing and a pair of self-lapping valve mechanisms mounted therein provided with actuating members for controlling the pressures delivered by said mechanisms in accordance with the degree of displacement of said members, of means for actuating said members and controlling the operation of said valve mechanisms to deliver desired pressures including a lever pivotally mounted on said housing for universal movement with respect thereto and operable for actuating one or both of said members whereby the pressure delivered by one or both of said valve mechanisms is substantially proportional to the corresponding degree of movement of said control lever, and means for connecting said lever and members.

5. The combination in a fluid pressure control valve having a casing provided with a plurality of separate control valve mechanisms of the self-lapping type each provided with inlet and exhaust valves, a pressure-responsive member for controlling the operation of the valves, a manually operable element for actuating the pressure responsive member and a resilient operating connection between the element and member, of means for selectively actuating said elements for controlling the operation of the corresponding valve mechanisms including a lever pivotally mounted for universal movement with respect to the casing and means associated therewith for effecting an operating connection between said lever and elements for effecting operation of any selected valve mechanism on corresponding movement of said lever.

6. The combination in a fluid pressure control valve having a casing provided with a plurality of separate control valve mechanisms of the self-lapping type each being provided with inlet and exhaust valves, a pressure-responsive element for controlling the operation of the valves, a manually operable member for actuating the pressure-responsive element and a resilient operating connection between the element and member, of means for selectively actuating said members for controlling the operation of the corresponding valve mechanisms including a lever pivotally mounted for universal movement with respect to the casing and means associated therewith for effecting an operating connection between said lever and members for effecting operation of at least two of said valve mechanisms at the same time on movement of said lever.

7. The combination in a fluid pressure control valve having a casing provided with a plurality of separate control valve mechanisms of the self-lapping type each provided with inlet and exhaust valves, a pressure-responsive element for controlling the operation of the valves, a manually operable member for actuating the pressure responsive element and a resilient operating connection between the element and member, of means for selectively and sequentially actuating at least two of said members for controlling the operation of the corresponding valve mechanisms including a lever pivotally mounted for universal movement with respect to the casing and means associated therewith for effecting an operating connection between said lever and at least two of said members at the same time for effecting operation of said two valve mechanisms on corresponding movement of said lever.

8. The combination in a fluid pressure control valve having a casing provided with a plurality of separate control valve mechanisms of the self-lapping type serially arranged in the casing and each provided with inlet and exhaust valves, a pressure-responsive element for controlling the operation of the valves, a manually operable member for actuating the pressure-responsive element and a resilient operating connection between the element and member, of means for selectively actuating said members for controlling the operation of the corresponding valve mechanisms separately and for controlling any adjacent pair of members and the corresponding valve mechanisms concurrently including a lever pivotally mounted for universal movement with respect to the casing and means associated therewith for effecting an operating connection between said lever and members.

9. The combination in a fluid pressure control valve having a casing provided with a plurality of separate control valve mechanisms of the self-lapping type each provided with inlet and exhaust valves, a pressure-responsive element for controlling the operation of the valves, a manually operable member for actuating the pressure responsive element and a resilient operating connection between the element and member, of means for selectively actuating any one of said members for controlling the operation of the corresponding valve mechanism individually and for operating any two adjacent members concurrently for effecting concurrent operation of the corresponding control valves including a lever pivotally mounted for universal movement with respect to the casing and means associated therewith for effecting an operating connection between said lever and members.

10. The combination in a fluid pressure control valve having a casing provided with a plurality of separate control valve mechanisms of the self-lapping type serially arranged in the casing and each provided with inlet and exhaust valves, a pressure-responsive element for controlling the operation of the valves, a manually operable member for actuating the pressure-responsive element and a resilient operating connection between the element and member, of means for selectively actuating said members for controlling the operation of the corresponding valve mechanisms including a lever pivotally mounted for universal movement with respect to the casing, means associated therewith for effecting an operating connection between said lever and members, and means associated with the casing for guiding the movements of said lever for selectively effecting individual operation of any one of said valve mechanisms.

11. The combination in a fluid pressure control valve having a casing provided with a plurality of separate control valve mechanisms of the self-lapping type serially arranged with respect to said casing and each provided with inlet and exhaust valves, a pressure-responsive element for controlling the operation of the valves, a manually operable member for actuating the pressure-responsive element and a resilient operating connection between the element and member, of means for selectively actuating said members for controlling the operation of the corresponding valve mechanisms including a lever pivotally mounted for universal movement with respect to the casing, means associated therewith for effecting an operating connection between said lever and members, and means carried by said casing for guiding said lever whereby said lever may be moved to effect selective operation of any one of said members and sequential operation of the members of any two adjacent valve mechanisms.

12. The combination in a fluid pressure control valve having a casing provided with two pairs of oppositely disposed control valve mechanisms of the self-lapping type, each valve mechanism being provided with inlet and exhaust valves, a pressure-responsive element for controlling the operation of the valves, a manually operable member for actuating the pressure-responsive element and a resilient operating connection between the element and member, of means for controlling the operation of said valve mechanisms including a lever pivotally mounted on said casing having a connection with said members and adapted on movement in one plane for actuating one or the other of the valve mechanisms of one of said pair and operable in another plane for operating one or the other of the valve mechanisms of said other pair, and means carried by the housing for guiding said lever whereby said lever is operable in first one plane and then in the other plane to effect sequential operation of one of the valve mechanisms of each pair.

13. The combination in a fluid pressure control valve having a casing provided with a plurality of separate control valve mechanisms of the self-lapping type each provided with inlet and exhaust valves, a pressure-responsive element for controlling the operation of the valves, a manually operable member for actuating the pressure-responsive element and a resilient operating connection between the element and member, of means for controlling the operation of said valves and selectively operating one or more than one of said valves at the same time including a lever pivotally mounted with respect to said casing for universal movement and having a connection with said manually operable members, and means associated with the casing defining neutral and valve operating positions for said lever including means for maintaining said lever in any one of said positions.

14. The combination in a fluid pressure control valve having a casing provided with a plurality of separate control valve mechanisms of the self-lapping type adapted to supply fluid pressure to any one of a plurality of fluid pressure operated devices and provided with inlet and exhaust valves, a pressure-responsive element for controlling the operation of the valves, a manually operable member for actuating the pressure-responsive element and a resilient operating connection between the element and member, of means for controlling said valve mechanisms for rendering them effective for supplying fluid pressure to one or more than one of said devices at the same time including a lever pivotally mounted for movement with respect to said housing having a connection with said members and having a neutral position and movable from said neutral position to other positions to effect operation of one or more than one of said valve mechanisms at the same time to supply fluid pressure to one or more than one of said devices, and means associated with said casing for maintaining said lever in any one of said operative positions.

ROGER H. CASLER.
STEPHEN VORECH.